United States Patent
Bonilla (10) Patent No.: US 10,189,511 B1
(45) Date of Patent: Jan. 29, 2019

(54) VEHICLE BODY BARRIER

(71) Applicant: Nissan North America, Inc., Franklin, TN (US)

(72) Inventor: Jose Luis Perez Bonilla, Estado de Mexico (MX)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/799,370

(22) Filed: Oct. 31, 2017

(51) Int. Cl.
*B62D 33/037* (2006.01)
*B62D 33/027* (2006.01)
*B62D 33/033* (2006.01)

(52) U.S. Cl.
CPC ....... *B62D 33/0276* (2013.01); *B62D 33/027* (2013.01); *B62D 33/037* (2013.01); *B62D 33/033* (2013.01)

(58) Field of Classification Search
CPC .............. B62D 33/0276; B62D 33/037; B62D 33/027; B62D 33/0207; B62D 33/023; B62D 33/033
USPC ....... 296/10, 15, 26.05, 26.07, 32, 34, 186.1
See application file for complete search history.

(56) References Cited

U.S. PATENT DOCUMENTS

| | | | | |
|---|---|---|---|---|
| 864,296 A | * | 8/1907 | Falkner | B60N 2/3095 296/32 |
| 1,311,429 A | * | 7/1919 | Weir | B60P 3/42 296/10 |
| 3,430,676 A | * | 3/1969 | Aberg | E06B 3/921 160/202 |
| 3,460,864 A | | 8/1969 | Piercy | |
| 3,986,317 A | | 10/1976 | Mountz | |
| 7,222,905 B2 | | 5/2007 | Jaeck | |
| 2015/0232133 A1 | | 8/2015 | Miller | |

FOREIGN PATENT DOCUMENTS

DE 3138338 A1 * 4/1983 ............ B60J 7/1614

* cited by examiner

*Primary Examiner* — Dennis H Pedder
(74) *Attorney, Agent, or Firm* — Global IP Counselors, LLP (57) ABSTRACT

A vehicle body barrier has a vertical support, a first non-movable board and a second non-movable board. The vertical support is configured to be received in a vehicle body. The first non-movable board is fixedly attached to the vertical support. The second non-movable board is fixedly attached to the vertical support and is vertically spaced from the first non-movable board. The movable board is movably connected to the first non-movable board between a primarily offset position and a primarily overlapping position. The movable board is disposed between the first and second non-movable boards in the primarily offset position.

20 Claims, 9 Drawing Sheets

FIG. 12

VEHICLE BODY BARRIER

BACKGROUND

Field of the Invention

The present invention generally relates to a vehicle body barrier. More specifically, the present invention relates to a vehicle body barrier configured to be supported on a vehicle having a cargo receiving area.

Background Information

Vehicle truck and trailer structures are configured to transport large amounts of cargo. These vehicles typically include a large sized cargo receiving area that can be enclosed by one or more vehicle body barriers, which can be installed or removed from the vehicle structure at will. Vehicle body barriers can be configured to have a variety of sizes and versatile structure to enclose the cargo receiving area.

SUMMARY

In view of the state of the known technology, one aspect of the present disclosure is to provide a vehicle body barrier comprising a vertical support, a first non-movable board and a second non-movable board. The vertical support is configured to be received in a vehicle body. The first non-movable board is fixedly attached to the vertical support. The second non-movable board is fixedly attached to the vertical support, and is vertically spaced from the first non-movable board. The movable board is movably connected to the first non-movable board between a primarily offset position and a primarily overlapping position. The movable board is disposed between the first and second non-movable boards in the primarily offset position.

In view of the state of the known technology, a second aspect of the present disclosure is to provide a vehicle body barrier comprising a vertical support, a first non-movable board and a second non-movable board. The first non-movable board is fixedly attached to the vertical support. The first non-movable board has a pocket. The movable board is movably connected to the non-movable board between a primarily offset position and a primarily overlapping position. The pocket is sized and dimensioned to receive the movable board so that the movable board is disposed substantially inside the pocket in the primarily overlapping position and is disposed substantially outside the pocket in the primarily offset position.

Also other objects, features, aspects and advantages of the disclosed vehicle body barrier will become apparent to those skilled in the art from the following detailed description, which, taken in conjunction with the annexed drawings, discloses preferred embodiments of the vehicle body barrier.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the vehicle field from this disclosure that the following descriptions of the embodiments are provided for illustration only and not for the purpose of limiting the invention as defined by the appended claims and their equivalents.

Figure 1:
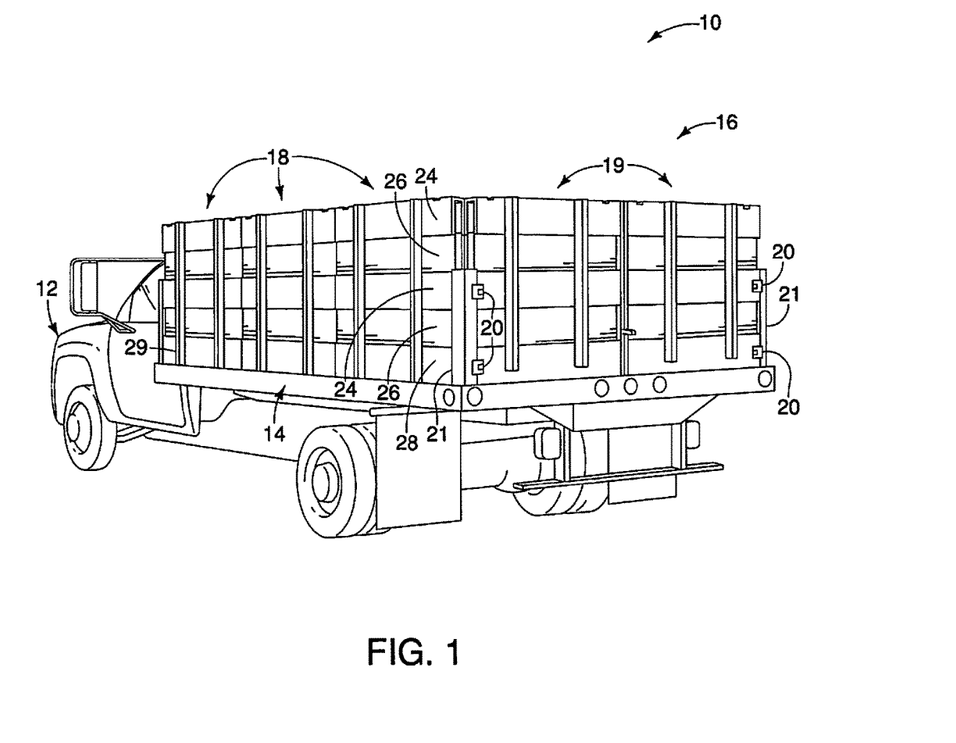
FIG. 1 is a rear perspective view of a vehicle having a vehicle body barrier disposed thereon with the vehicle body barrier being in a closed state.

Referring initially to FIG. 1, a vehicle 10 is illustrated in accordance with a first embodiment. As shown, the vehicle 10 is a truck having a vehicle body 12 configured to support a flatbed or platform 14. In other words, the vehicle 10 of the illustrated embodiment is a flatbed truck, which can be a semi-trailer truck or a rigid truck. The flatbed 14 is a conventional flatbed having a level bed bodywork that is substantially flat to define a cargo receiving area A. This configuration allows for quick and easy loading for the transportation of heavy loads stowed within the cargo receiving area A.

In the illustrated embodiment, the flatbed 14 is configured to receive a vehicle body barrier 16, as will be further discussed below. In other words, the flatbed 14 is configured to support the vehicle body barrier 16. As shown, the vehicle body barrier 16 includes a plurality of barrier sections 18 enclosing the cargo receiving area A. In the illustrated embodiment, the barrier sections 18 extend upwardly with respect to the cargo receiving area A. While the vehicle 10 of the illustrated embodiment is a flatbed truck, it will be further apparent to those skilled in the vehicle field from this disclosure that the vehicle body barrier 16 of the illustrated embodiment can be configured for other vehicles such as a pickup truck as needed and/or desired.

In the illustrated embodiment, the barrier sections 18 disposed are identical at the front and two sides of the cargo receiving area A. The vehicle body barrier includes two additional barrier sections 19 that are configured as doors for the cargo receiving area A. As shown, each of the barrier sections 19 has a pair of hinges 20 hingedly connected to a corner post 21. In this way, the barrier sections 19 rotate on the hinges 20 to provide access to and close the cargo receiving area A.

While the vehicle 10 of the illustrated embodiment is illustrated as having a total of ten of the barrier sections 18 and 19 to close the cargo receiving area A, it will be apparent to those skilled in the vehicle field from this disclosure that vehicle 10 can be configured to receive additional or fewer barrier sections as needed and/or desired. For example, instead of having a plurality of barrier sections 18 disposed at each side of the cargo receiving area A, the vehicle 10 can alternatively include just a single elongated barrier section that extends the entire length of a side of the cargo receiving area A if desired. Additionally, each of the barrier sections 18 can be configured to have boards that are larger or smaller in a vertical width or a horizontal height as needed and/or desired.

In the illustrated embodiment, any one of the barrier sections 18 and 19 can be considered an example of a first vehicle body barrier and any one of the other barrier sections 18 and 19 can be considered an example of a second vehicle body barrier. As the barrier sections 18 and 19 are basically identical except for their size, mounting (fixed or hinged) and orientation on the vehicle flatbed 14, only one of the barrier sections 18 will be further discussed herein.

Figure 2:
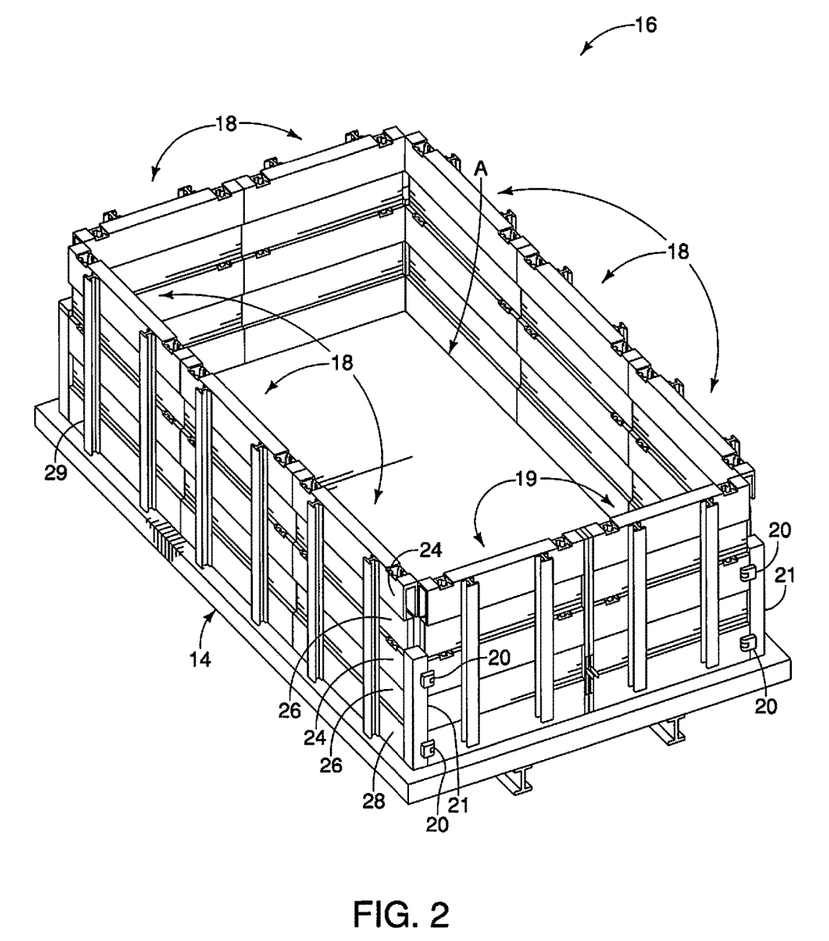
FIG. 2 is a top perspective view of a cargo receiving area of the vehicle of FIG. 1 having the vehicle body barrier in the closed state.
Figure 3:
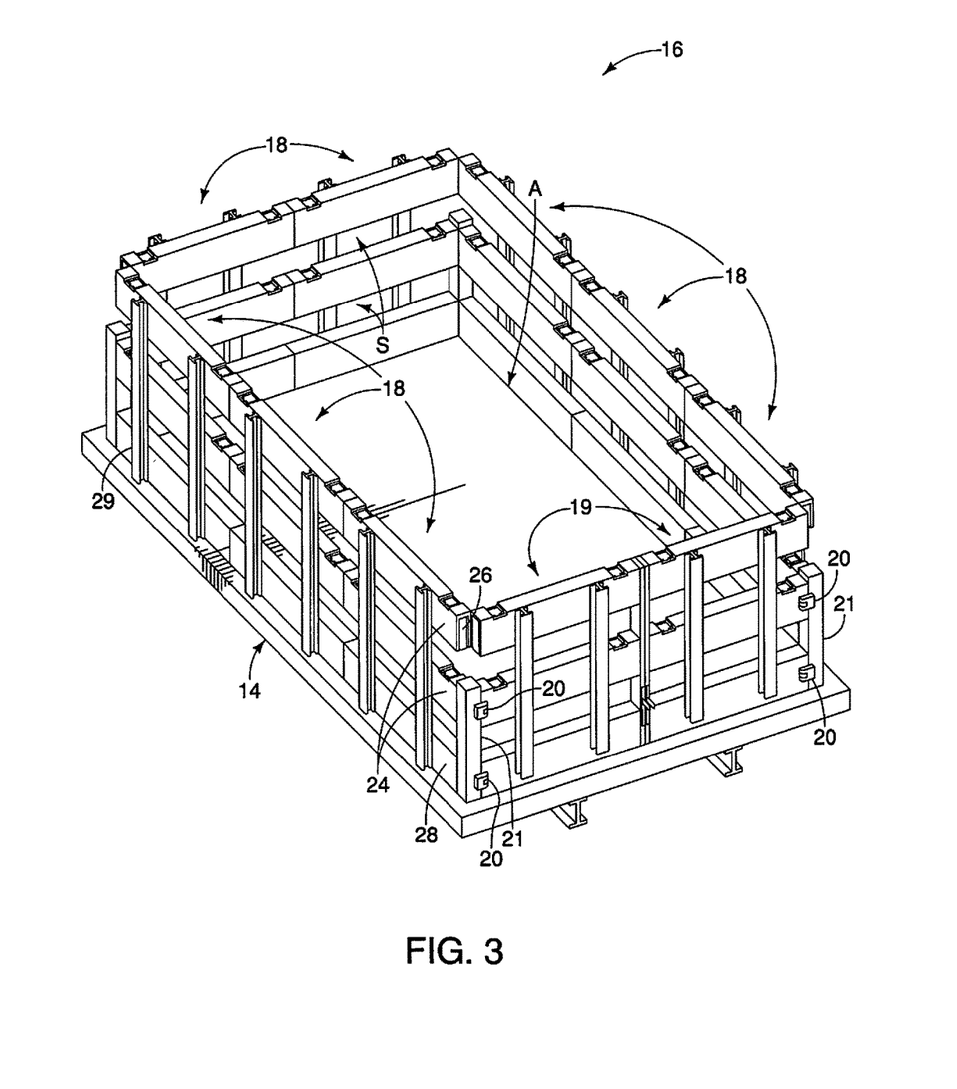
FIG. 3 is a top perspective view of the cargo receiving area of FIG. 2, the vehicle body barrier being in an open state.

Referring to FIGS. 2 to 3, the barrier section 18 of the illustrated embodiment each includes a plurality of non-movable boards 24 and a plurality of movable boards 26. The movable boards 26 can be selectively adjusted to open (FIG. 3) and close (FIG. 2) horizontal spaces S between vertically adjacent ones of the non-movable boards 24. In the illustrated embodiment, each of the movable boards 26 is movably connected to a select one of the non-movable board 24 between a primarily offset position (FIG. 2) and a primarily overlapping position (FIG. 3). In the illustrated embodiment, the primarily offset position will correspond to a position in which over fifty percent of a movable board 26 is disposed offset from a select one of the non-movable boards 24. In the illustrated embodiment, the primarily overlapping position will correspond to a position in which over fifty percent of the movable board 26 overlaps with the select one of the non-movable boards 24.

As will be discussed below, each of the movable boards 26 is movable with respect to the non-movable boards 24 to close a horizontal space S between two vertically adjacent ones of the non-movable boards 24. Thus, in the illustrated embodiment, the primarily offset position also corresponds to a position of the movable board 26 that is disposed in the horizontal space S between vertically adjacent ones of the non-movable boards 24. In the illustrated embodiment, the movable board 26 preferably has a height that is greater than a distance (e.g., the horizontal space S) between the adjacent ones of the non-movable boards 24 so that the movable board 26 entirely closes the space S in the primarily offset position. To open the horizontal space S, the movable board 26 is positioned so as to be primarily inside a pocket 30 of the selected one of the non-movable boards 24, as will be further discussed below.

As seen in FIGS. 2 and 3, the barrier section 18 includes two of the non-movable boards 24 that are vertically spaced from each other and two of the movable boards 26 vertically alternating with respect to the non-movable boards 24. The barrier section 18 further includes an additional non-movable board 28 that is disposed on a bottommost row of the barrier section 18. In the illustrated embodiment, the additional non-movable board 28 is a conventional board without a pocket and will not be further discussed herein. However, the additional non-movable boards 28 can be replaced with the non-movable boards 24 and movable boards 26 if the height of the barrier section 18 is increased. As shown, each of the barrier sections 18 further includes a pair of identical vertical supports 29.

It will be apparent to those skilled in the vehicle field from this disclosure that the barrier sections 18 can include additional non-movable boards 24 and movable boards 26. It will also be apparent to those skilled in the vehicle field from this disclosure that the barrier sections 18 can include additional vertical supports 29 as needed and/or desired to secure the movable and non-movable boards 26 and 24 to the flatbed 14.

The vertical supports 29 will now be discussed in more detail. As previously stated, the flatbed 14 is configured to support the barrier sections 18. As illustrated, the vertical supports 29 are to be fixed to the flatbed 14. The vertical supports 29 are rigid posts such as upright steel pillars. Alternatively, the vertical supports 29 can be wooden posts or plastic posts. The vertical supports 29 are fixedly secured to the flatbed 14 in a conventional manner such as by sockets, welding or by bolts. For example, the vertical supports 29 can be fixed to the flatbed 14 by being inserted into sockets of the flatbed 14. Alternatively, the vertical supports 29 can be fixedly supported to a side surface of the flatbed 14 via a stake socket that can be bolted or welded to the side surface of the flatbed 14. The vertical supports 29 are conventional and can be configured to have varying lengths, sizes and/or dimensions to support the non-movable boards and movable boards 24 and 26 as needed and/or desired.

Figure 4:
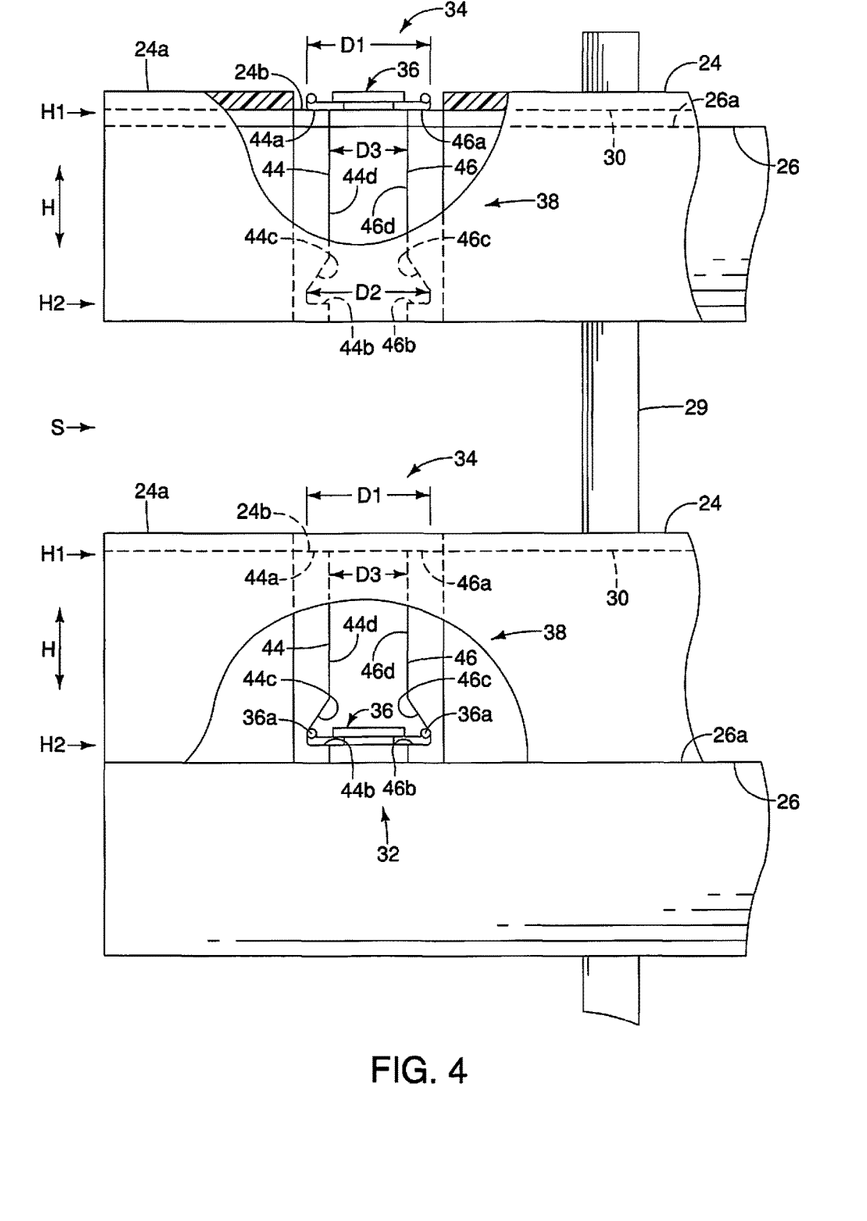
FIG. 4 is a portion of the vehicle body barrier showing a movable board disposed in a primarily overlapping position with a non-movable board (a top portion broken away) and another movable board disposed in a primarily offset position with another movable board (a bottom portion broken away)
Figure 5:
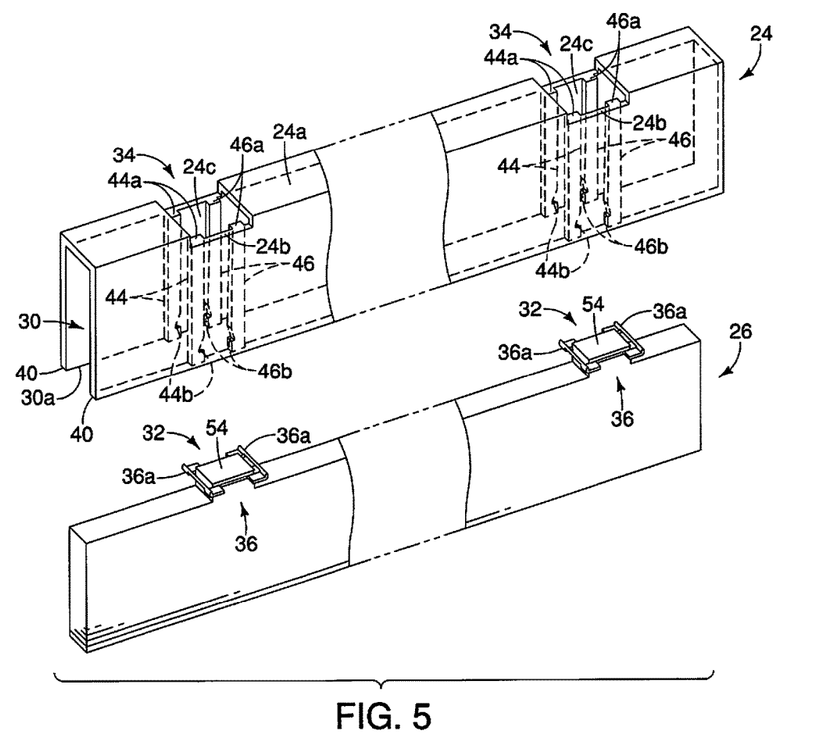
FIG. 5 is a side perspective view of one of the non-movable boards and one of the movable boards of the vehicle body barrier of FIGS. 1 to 4.

In the illustrated embodiment, as all the non-movable boards 24 are identical and all the movable boards 26 are identical, only one of the non-movable boards 24 and one of the movable boards 26 will be discussed in detail herein. Referring to FIG. 4, the movable board 26 is movable with respect to the non-movable board 24 between the primarily offset position (bottom breakaway) and the primarily overlapping position (top breakaway). In the illustrated embodiment, the movable board 26 has a first engagement structure 32 and the non-movable board 24 has a second engagement structure 34. The second engagement structure 34 is configured to engage the first engagement structure 32 to lock the movable board 26 in the primarily overlapping position and the primarily offset position. Also, in the illustrated embodiment, the first engagement structure 32 includes a pair of spring latches 36. The second engagement structure 34 includes a latch receiver 38 for engaging the latch 36.

In the illustrated embodiment, while the movable board 26 is illustrated as including the latch 36 and the non-movable board 24 is illustrated as including the latch receiver 38, it will be apparent to those in the vehicle field from this disclosure that alternatively, the non-movable board 24 can be configured to also include the latch 36 to lock the movable board 26 in the primarily offset and the primarily overlapping positions. Thus, one of the first and second engagement structures 32 and 34 includes the latch 36 and the other of the first and second engagement structures 32 and 34 includes the latch receiver 38 for engaging the latch 36. The first and second engagement structures 32 and 34 will be further discussed in greater detail below.

The non-movable board 24 will now be further discussed with reference to FIGS. 4 to 9. The non-movable board 24 is fixedly attached to a pair of the vertical supports 29 in a conventional manner such as by bolting. The non-movable board 24 is preferably constructed of a rigid, lightweight material such as plastic. Alternatively, the non-movable board 24 can be constructed of other suitable rigid materials such as a metallic material. Thus, the non-movable board 24 is preferably a rigid board formed of plastic or metal. As previously stated, the non-movable board 24 includes the pocket 30. In the illustrated embodiment, best seen in FIG. 5, the non-movable board 24 is illustrated as having a pair of elongated walls 40 separated by the pocket 30 therebetween such that the non-movable board 24 has a U-shaped structure.

Figure 6:
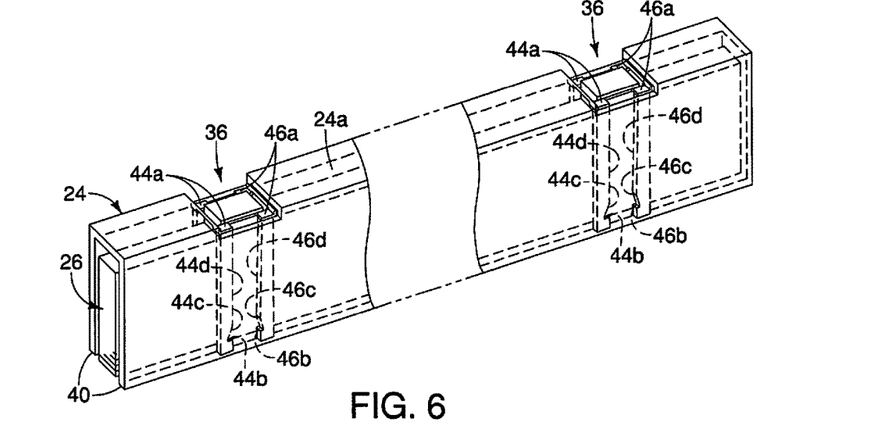
FIG. 6 is a side perspective view of the non-movable board and the movable board of FIG. 5 in the primarily overlapping position.
Figure 8:
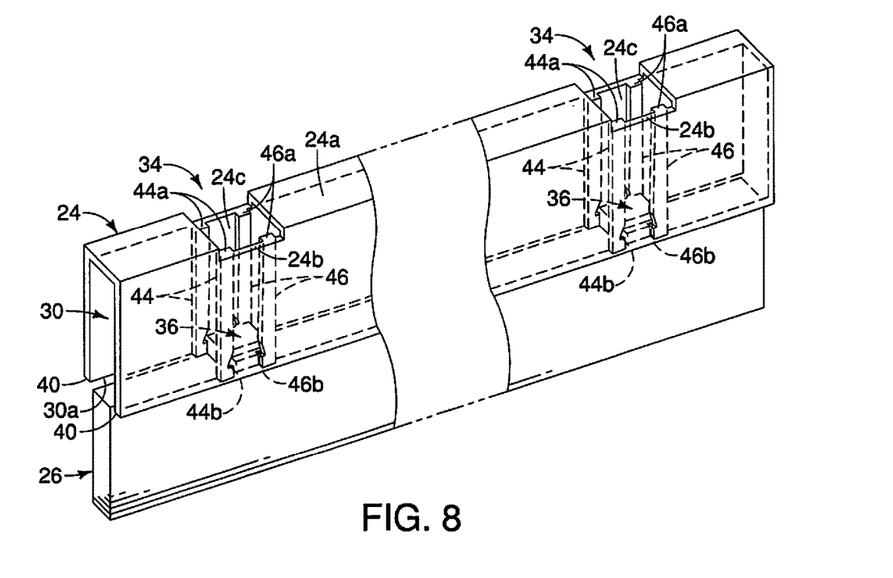
FIG. 8 is a side perspective view of the non-movable board and the movable board of FIGS. 5 to 7 in the primarily offset position.

In the primarily overlapping position, the movable board 26 is positioned primarily inside the pocket 30 of the non-movable board 24 (FIG. 6). Preferably, the movable board 26 is configured to be entirely disposed within the pocket 30 into the primarily overlapping position. Thus, the pocket 30 preferably has dimensions to substantially receive the entirety of the movable board 26 within the pocket 30 in the overlapping position. As shown, the pocket 30 has an opening 30a disposed on the bottom of the non-movable board 24 such that the movable board 26 is a U-shaped board as seen from a sideview of the non-movable board 24. The movable board 26 is received through the opening 30a. This way, the movable board 26 can be pulled downward by a user out of the pocket 30 to close the horizontal space S between non-movable boards 24. As best seen in FIGS. 4 and 8, a portion of the movable board 26 extends through the opening 30a in the primarily offset position. It will be apparent to those skilled in the vehicle field from this disclosure that the non-movable board 24 can alternatively have a pocket opening from a top of the non-movable board 24. In this configuration, the movable board 26 can be pulled upward from the non-movable board 24 to close the horizontal space S between adjacent ones of the non-movable boards 24.

The pocket 30 includes the second engagement structure 34, which includes the latch receiver 38. In the illustrated embodiment, the latch receiver 38 is disposed inside the pocket 30 of the non-movable board 24. In the illustrated embodiment, the non-movable board 24 includes a pair of second engagement structures 34, each having a latch receiver 38 that are identical. Each of the latch receivers 38 engages a respective one of the latches 36 to hold the movable board 26 in each of the open position and the closed position. Only one of the latch receivers 38 will be discussed for simplicity.

Referring to FIGS. 4 to 9, the latch receiver 38 is defined by a pair of rails 44 and a pair of opposing rails 46. While the latch receiver 38 are illustrated as having four rails 44 and 46, it will be apparent to those skilled in the vehicle field from this disclosure that the latch receiver 38 can be configured to just include a single pair of rails 44 or 46 to engage the latch 36. As shown, the opposing rails 46 are laterally spaced from the pair of rails 44. The rails 44 and the opposing rails 46 extend along a heightwise H direction of the non-movable board to define a passageway P, best seen in FIG. 9. In the illustrated embodiment, the rails 44 and the opposing rails 46 are preferably integrally formed to the end walls 40. The movable board 26 moves along the passageway P between the primarily offset and the primarily overlapping positions. The latch receiver 38 includes a plurality of abutments that define engagement portions that engage the latch 36 of the movable board 26.

In particular, as best seen in FIG. 4, each of the pair of rails 44 includes a first abutment 44a disposed at a first height H1 of the non-movable board 24. In other words, the second engagement structure 34 includes a pair of the first abutments 44a disposed at the first height H1. Similarly, each of the pair of opposing rails 46 includes a first opposing abutment 46a disposed at the first height H1. In other words, the second engagement structure 34 includes a pair of first opposing abutments 46a disposed at the first height H1 and are laterally spaced from the first abutments 44a.

Figure 9:
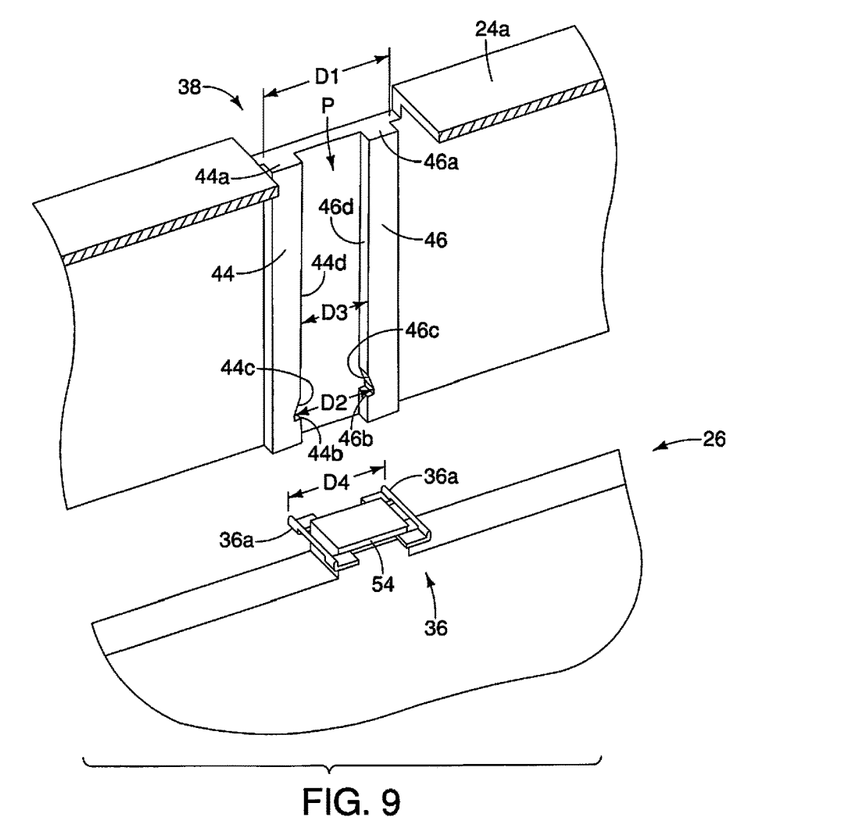
FIG. 9 is a side perspective view of a portion of the movable board of FIGS. 5 to 8 showing a first engagement structure and a portion of the non-movable board of FIGS. 5 to 8 showing a portion of a second engagement structure.

As shown in FIGS. 4 and 6, the latch 36 is configured to rest on the pair of first abutments 44a and the pair of first opposing abutments 46a in the primarily overlapping position to open the horizontal space S between adjacent ones of the non-movable boards 24. In the illustrated embodiment, the first height H1 is disposed adjacent a top surface 24a of the non-movable board 24. As best seen in FIGS. 4 and 9, the pair of first abutments 44a and the pair of first opposing abutments 46a define a lower stepped surface 24b with respect to the top surface 24a of the non-movable board 24. The lower stepped surface 24b includes a latch opening 24c sized and dimensioned to receive the latch 36 therethrough, which will be further discussed below. Preferably, the latch 36 is dimensioned to be flush with the top surface 24a of the non-movable board 24 in the primarily overlapping position.

Each of the pair of rails 44 also includes a second abutment 44b disposed at a second height H2 of the non-movable board 26. In other words, the second engagement structure 34 includes a pair of second abutments 44b disposed at the second height H2. Similarly, each of the pair of rails 46 further includes a second opposing abutment 46b disposed at the second height H2. In other words, the second engagement structure 34 includes a pair of second opposing abutments 46b disposed at the second height H2 and are laterally spaced from the second abutments 44b.

The second height H2 is vertically spaced from the first height H1 along the heightwise direction H of the non-movable board 24. As shown in FIGS. 4 and 8, the latch 36 is configured to sit on the second abutments 44b and the second opposing abutments 46b in the primarily offset position. Thus, the second abutments 44b and the second opposing abutments 46b are disposed closer to the opening 30a with respect to the first abutments 44a and the first opposing abutments 46a.

As shown in FIGS. 4 and 9, the first abutments 44a and the first opposing abutments 46a are laterally spaced by a first distance D1. In other words, the first abutments 44a and 46a are laterally spaced to define the first distance D1 across of the passageway P. The second abutments 44b and the second opposing abutments 46b are laterally spaced by a second distance D2. In other words, the second abutments 44b and 46b are laterally spaced to define the second distance D2 across the passageway P. Further, each of the rails 44 includes an inside facing surface 44d. Similarly, each of the opposing rails 46 includes an opposing inside facing surface 46d that are spaced from the inside facing surface 44d by a third distance D3. In the illustrated embodiment, the third distance D3 is less than the first and second distances D1 and D2.

Figure 7:
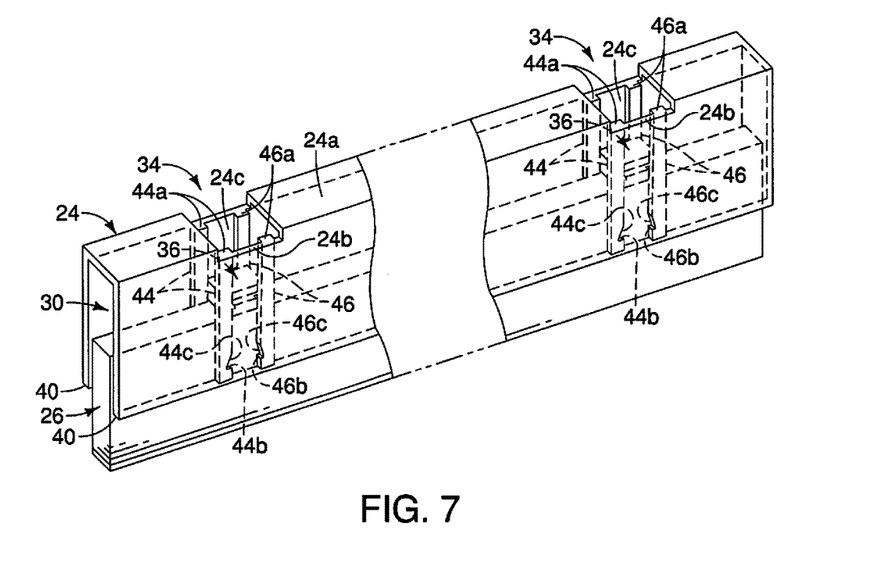
FIG. 7 is a side perspective view of the non-movable board and the movable board of FIGS. 5 and 6 with the movable board moving in between the primarily overlapping and primarily offset positions.

Additionally, as shown, each of the rails 44 includes a slanted surface 44c extending in the heightwise direction H between the first and second abutments 44a and 44b. In other words, the second engagement structure 34 includes a pair of slanted surfaces 44c. Similarly, each of the opposing rails 46 include an opposing slanted surface 46c extending in the heightwise direction H between the first and second opposing abutments 46a and 46b. In other words, the second engagement structure 34 includes a pair of opposing slanted surfaces 46c that are laterally spaced from the pair of slanted surfaces 44c. When moving the movable board 26 from the primarily offset position to the primarily overlapping position, the latch 36 is pushed upwards against the slanted surfaces 44c and 46c to travel up the latch receiver 38, as seen in FIG. 7. In particular, the slanted surfaces 44c and 46c depress the latch members 36a so that the latch 36 can travel up the latch receiver 38. The latch 36 and the locking/unlocking mechanism will be further discussed below.

As stated, the non-movable board 24 includes a pair of identical second engagement structures 34 disposed laterally offset from one another. It will be apparent to those skilled in the vehicle field from this disclosure that the non-movable board 24 can include additional engagement structures or just a single engagement structure to secure the movable board 26 as needed and/or desired.

The movable board 26 will now be discussed. The movable board 26 is preferably a rigid board formed of plastic or metal. Alternatively, the movable board 26 can be formed of wood. As a further alternative, the movable board 26 can be made of metallic wires to form a wired fencing configured to be movably disposed in the space S between the non-movable boards 24. As previously stated, the movable board 26 includes the first engagement structure 32 that includes the latch 36.

Figure 10:
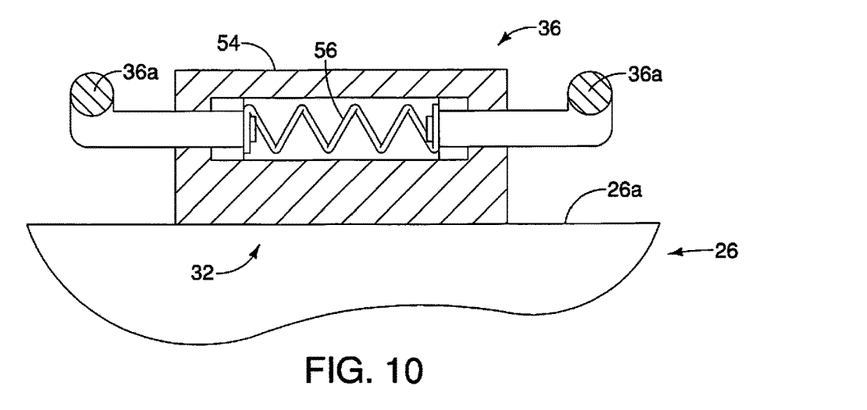
FIG. 10 is a cross-sectional view of the first engagement structure of the movable board of FIGS. 5 to 9.

Referring to FIGS. 9 and 10, the latch 36 will now be further discussed. The latch 36 includes a pair of latch members 36a that are biased with respect to each other between a locking position and an unlocking position, as will be further described below. The latch 36 is configured to lock the movable board 26 in the primarily offset and the primarily overlapping positions with respect to the non-movable board 24. The latch 36 further includes a main body 54 and a biasing spring 56. The main body 54 of the latch 36 houses the latch members 36a such that the latch members 36a extend from lateral sides of the main body 54. The main body 54 is preferably made of a rigid, lightweight material such as plastic or metal. The main body 54 is sized and dimensioned to sit on the lower stepped surface 24b of the top surface 24a of the non-movable board 24 in the primarily overlapping position best shown in FIG. 6.

As stated, the lower stepped surface 24b is partially defined by the pair of first abutments 44a and the pair of first opposing abutments 46a. Preferably, a top surface of the main body 54 lines up on the same plane with the top surface 24a of the non-movable board 24 in the primarily overlapping position. In the illustrated embodiment, the latch 36 is illustrated as being disposed on a top surface 26a of the movable board 26. However, it will be apparent to those skilled in the vehicle field from this disclosure that the latch 36 can be configured to be disposed on the sides of the movable board 26 while the non-movable board 24 can be configured to include latch receivers disposed on end walls connecting the elongated walls 40 to interact with the latch 36.

As best seen in FIG. 10, the latch members 36a are partially disposed in the main body 54 and extend outward therefrom in a plurality of positions. As stated, the latch members 36a are biased with respect to each other by the biasing spring 56 between a latching position and an unlatching position. In particular, the latch members 36a are connected by the biasing spring 56 which biases the latch members 36a outward with respect to the main body 54 into the latching position. Thus, the latch members 36a operate as operating arms of the latch 36. When the latch members 36a are fully extended to be in the latching position, the ends of the latch members 36a are separated by a fourth distance D4 that is a fully extended distance. The fourth distance D4 is greater than the third distance D3. Thus, the latch 36 has a maximum width in the latching position that is greater than third distance D3.

In the illustrated embodiment, the fourth distance D4 is preferably less than the first and second distances and D1 and D2. In this way, the latch members 36a latch the movable board 26 in the primarily overlapping position with the latch members 36a sitting on the abutments 44a and 46a. The latch members 36a latch the movable board 26 in the primarily offset position with the latch members 36a sitting on the second abutments 44b 46b.

To dislodge the latch 36 from the primarily overlapping position, a user presses against the latch members 36a towards the main body 54 to enable the latch 36 to be received through the latch opening 24c and travel through the latch receiver 38. In the unlatching position, the latch 36 has a width that is less than the third distance D3 to enable the latch 36 to travel through the latch receiver 38. The latch 36 will automatically latch itself in the primarily offset position when the latch 36 comes into contact with the second abutments 44b and 46b.

Figure 11:
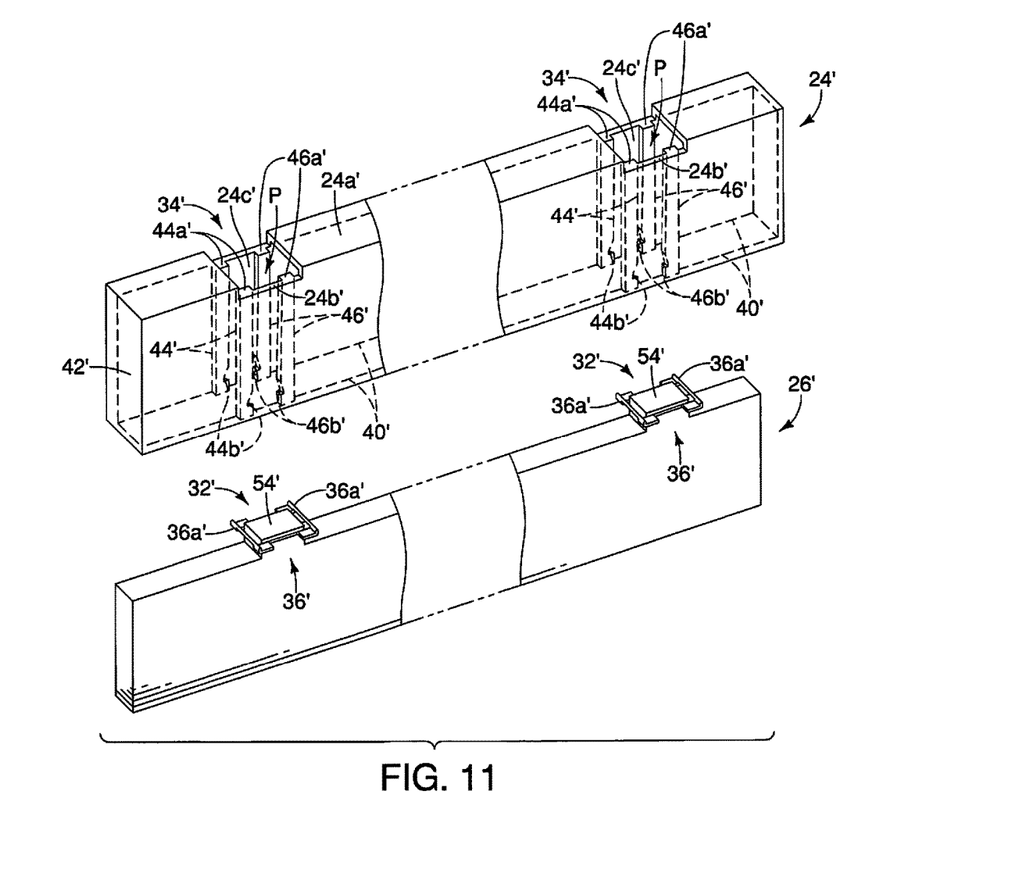
FIG. 11 is a side perspective view a modified non-movable board and a modified movable board.

Referring now to FIG. 11, a modified non-movable board 24' and a modified movable board 26' are illustrated. The modified non-movable board 24' and the modified movable board 26' can be utilized to form part of a vehicle body barrier that can be assembled to the vehicle body 12 as an alternative to the vehicle body barrier 18. The modified non-movable board 24' is identical to the non-movable board 24 except that the modified non-movable board 24' includes end walls 42' connecting the elongated walls 40'. Therefore, the modified non-movable board 24' is not a U-shaped board as with the non-movable board 24. The modified non-movable board 24' includes a single pocket opening 30a' disposed on a bottom surface of the modified non-movable board 24'.

The movable board 26' is identical to the movable board 26 except that it is dimensioned to be received into the single pocket opening 30a'. Thus, the movable board 26' is shorter in length than the modified non-movable board 24'.

Figure 12:
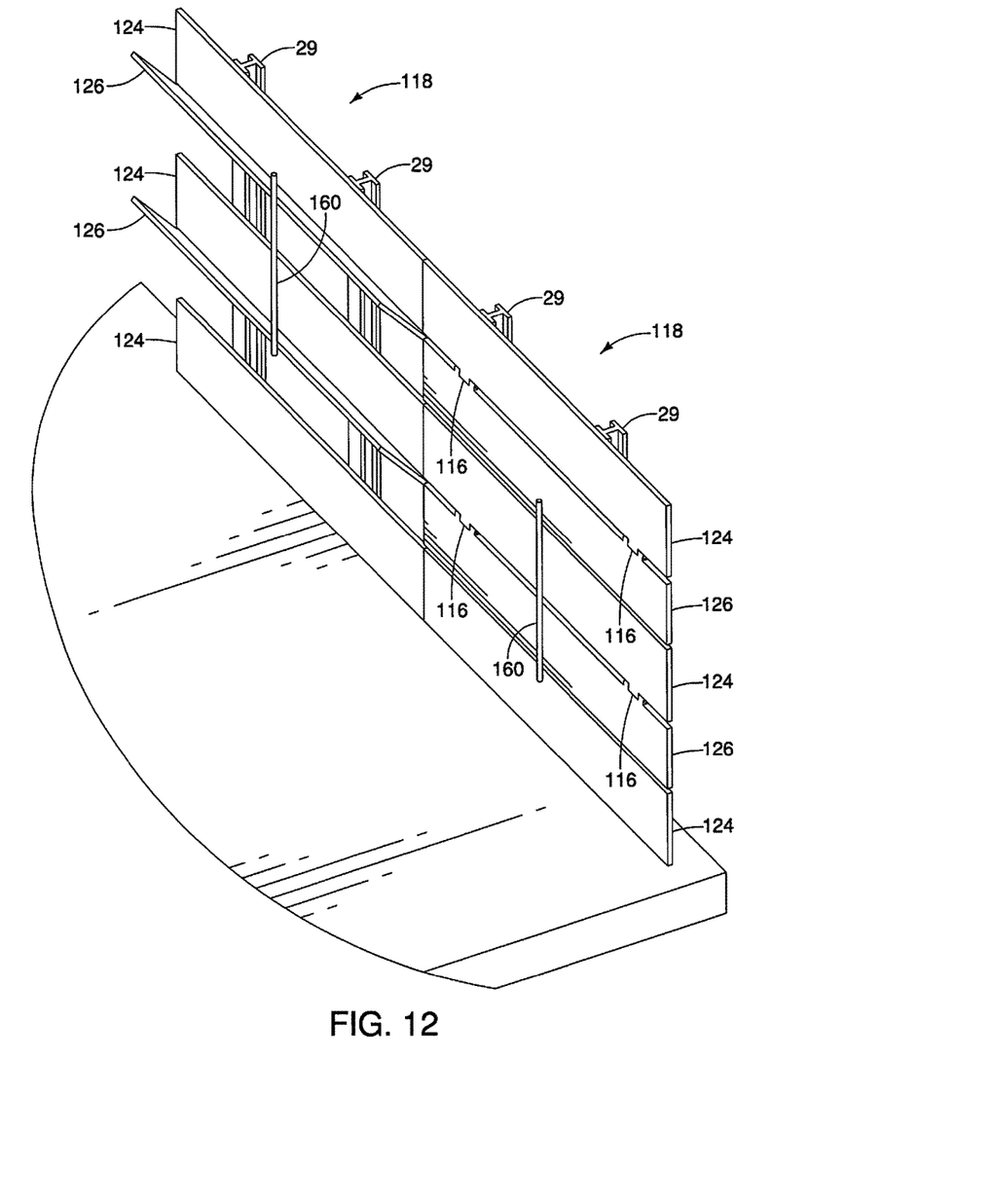
FIG. 12 is a side perspective view of a vehicle body barrier in accordance with a second illustrated embodiment.

Referring now to FIG. 12, a pair of barrier sections 118 that are configured to be assembled to the vehicle body 12 is illustrated in accordance with a second illustrated embodiment. The barrier sections 118 are similarly arranged and configured with respect to the barrier section 18 of the first illustrated embodiment. The pair of barrier sections 118 are identical and therefore only a single barrier section 118 will be further discussed for brevity. Further, due to the similarity between the barrier section 118 and the barrier section 18 of the first illustrated embodiment, all identical structures will receive the same reference numerals as the first illustrated embodiment and all corresponding structures will receive the same reference numerals but increased by 100.

The barrier section 118 includes a vertical support 29 configured to be received in the vehicle body. The barrier section 118 further includes a plurality of non-movable boards 124 that are vertically spaced from one another, and a plurality of movable boards 126 disposed between the non-movable boards 124. The non-movable boards 124 and the movable boards 126 are preferably identically sized and dimensioned and constructed of a sturdy, rigid, weather resistant material that is lightweight. As with the first illustrated embodiment, the barrier section 118 can be altered to include additional ones of any of the listed components of varying sizes and dimensions as needed and/or desired. As all of the non-movable boards 124 are identical and all of the movable boards are identical, only a single non-movable board 124 and a single movable board 126 will be discussed.

The non-movable board 124 is fixedly attached to the vertical support 29 in a conventional manner. The movable board 126 is movably connected to the non-movable board 124 between a primarily offset position and a primarily overlapping position. The movable board 126 is disposed between the non-movable boards 124 in the primarily offset position. The barrier section 118 further includes an operating structure 160 connected to the movable board 126 to operate the movable board 126 between the primarily offset position and the primarily overlapping position.

In the second illustrated embodiment, the primarily offset position (right barrier section 118) will correspond to a position in which over fifty percent of the movable board 126 is disposed offset from the non-movable board 124. In the second illustrated embodiment, the primarily offset position will correspond to a closed position of the movable board 126. In other words, the movable board 126 is disposed in the space S between the non-movable boards 124. Preferably, the movable board 126 is vertically aligned (i.e., on the same vertical plane) as the non-movable boards 124. In the primarily overlapping position (left barrier section 118), the movable board 126 can be moved to be positioned at approximately a ninety degree angle or less with respect to the non-movable board 124.

In the second illustrated embodiment, the movable board 126 is hingedly attached to the movable board 126 by one or more hinges 162. The movable board 126 is configured to pivot with respect to the non-movable board 124 via operation of the operating structure 160.

In the illustrated embodiment, the operating structure 160 is configured as a rigid rod that that is fixedly connected to a bottom surface of the movable board 126. Preferably the operating structure 160 is also fixedly connected to another movable board 126 so that the operation of the operating structure 160 enables simultaneous movement of the movable boards 126. It will be apparent to those skilled in the art that the operating structure 160 can have a variety of structures that can pivot the movable board 126 between the primarily overlapping and the primarily offset positions. For example, it will be apparent to those in the vehicle field that the operating structure 160 can be elongated or dimensioned to be connected to additional movable boards of the barrier section 118 as needed and/or desired. It will further be apparent to those skilled in the vehicle field that the barrier section 118 can be a motorized system such that a plurality of movable boards are operated simultaneously via actuation of the operating structure 160 in accordance with user desire.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle body barrier. Accordingly, these terms, as utilized to describe the present invention should be interpreted relative to a vehicle equipped with the vehicle body barrier.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle body barrier comprising:
   a vertical support configured to be received in a vehicle body;
   a first non-movable board fixedly attached to the vertical support;
   a second non-movable board that is fixedly attached to the vertical support and being vertically spaced from the first non-movable board; and
   a movable board movably connected to the first non-movable board between a primarily offset position and a primarily overlapping position, the movable board being disposed between the first and second non-movable boards in the primarily offset position.

2. The vehicle body barrier according to claim 1, wherein the first non-movable board includes a pocket sized and dimensioned to receive the movable board, the movable board being movably disposed in the pocket in the primarily overlapping position.

3. The vehicle body barrier according to claim 2, wherein the pocket includes an opening that is disposed on a bottom-facing surface of the first non-movable board, a portion of the movable board extending through the opening in the primarily offset position.

4. The vehicle body barrier according to claim 2, wherein the movable board has a first engagement structure, the first non-movable board has a second engagement structure configured to engage the first engagement structure to lock the movable board in the primarily overlapping position and the primarily offset position.

5. The vehicle body barrier according to claim 4, wherein one of the first and second engagement structures includes a latch, the other of the first and second engagement structures includes a latch receiver for engaging the latch.

6. The vehicle body barrier according to claim 5, wherein the latch receiver is disposed inside the pocket of the first non-movable board.

7. The vehicle body barrier according to claim 6, wherein the latch receiver includes a first side wall laterally spaced from a second side wall to define a passageway that accommodates the latch.

8. The vehicle body barrier according to claim 7, wherein the latch receiver includes a pair of first abutments disposed at a first height to hold the movable board in the primarily overlapping position and a pair of second abutments disposed at a second height to hold the movable board in the primarily offset position, one of the first abutments is disposed adjacent each of the first and second side walls.

9. The vehicle body barrier according to claim 8, wherein the first abutments are laterally spaced to define a first distance across of the passageway, the second abutments are laterally spaced to define a second distance across the passageway,
the first and second side walls are spaced apart by a third distance that is less than the first and second distances.

10. The vehicle body barrier according to claim 9, wherein
the latch receiver includes a pair of slanted surfaces extending inward from the second abutments towards each other and in a direction towards the first abutments.

11. The vehicle body barrier according to claim 10, wherein
the first engagement structure includes a latch, the latch having a first latch member and a second latch member, the first and second latch members being biased with respect to each other by a biasing spring between a latching position and an unlatching position.

12. The vehicle body barrier according to claim 11, wherein
the latch having a maximum width in the latching position that is greater than third distance.

13. A vehicle comprising the vehicle body barrier according to claim 1, the vehicle further comprising
the vehicle body having a cargo receiving surface, the vehicle body barrier extending upwardly with respect to the cargo receiving area.

14. The vehicle according to claim 13, wherein
the vehicle body barrier is a first vehicle body barrier and the vehicle further comprises a second vehicle body barrier disposed on the cargo receiving area opposite of the first vehicle body barrier.

15. A vehicle body barrier comprising:
a vertical support configured to be received in a vehicle body;
a first non-movable board fixedly attached to the vertical support, the first non-movable board having a pocket; and
a movable board movably connected to the non-movable board between a primarily offset position and a primarily overlapping position, the pocket being sized and dimensioned to receive the movable board so that the movable board is disposed substantially inside the pocket in the primarily overlapping position and is disposed substantially outside the pocket in the primarily offset position.

16. The vehicle body barrier according to claim 15, wherein
the pocket includes an opening that is disposed on a bottom-facing surface of the first non-movable board.

17. The vehicle body barrier according to claim 16, wherein
the movable board has a first engagement structure, the first non-movable board has a second engagement structure configured to engage the first engagement structure to lock the movable board in the primarily overlapping position and the primarily offset position.

18. The vehicle body barrier according to claim 17, wherein
one of the first and second engagement structures includes a latch, the other of the first and second engagement structures includes a latch receiver for engaging the latch.

19. The vehicle body barrier according to claim 18, wherein
the latch receiver is disposed inside the pocket of the first non-movable board.

20. The vehicle body barrier according to claim 19, wherein
the latch receiver is defined by a pair laterally spaced rails that each includes a first abutment disposed at a first height to hold the movable board in the primarily overlapping position and a second abutment disposed at a second height to hold the movable board in the primarily offset position.

* * * * *